June 29, 1943.  A. ZIELESCH ET AL  2,323,270
DRY ICE REFRIGERATING UNIT
Filed April 1, 1941  4 Sheets-Sheet 1
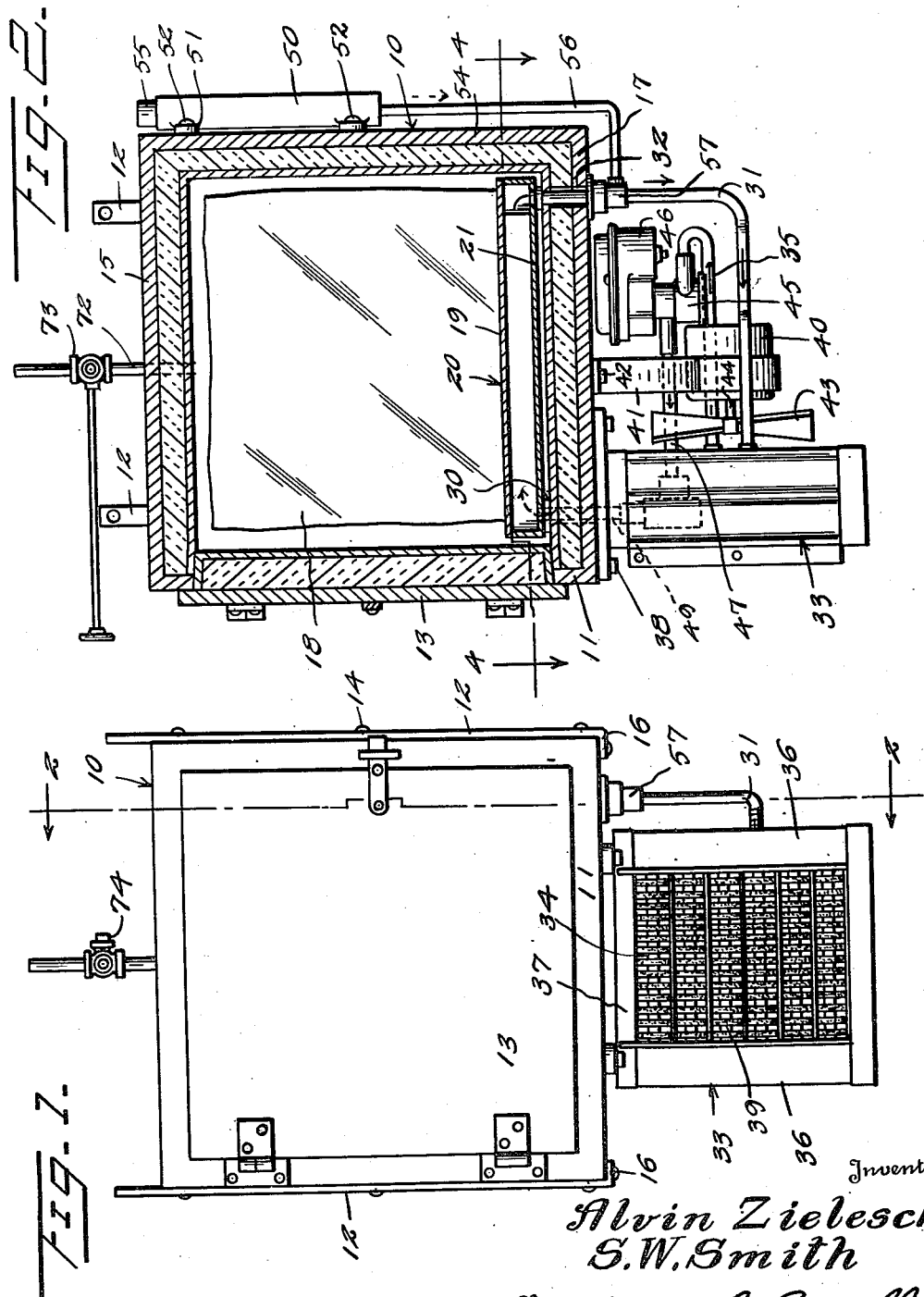
Inventor
Alvin Zielesch
S. W. Smith
By Kimmel & Crowell
Attorneys

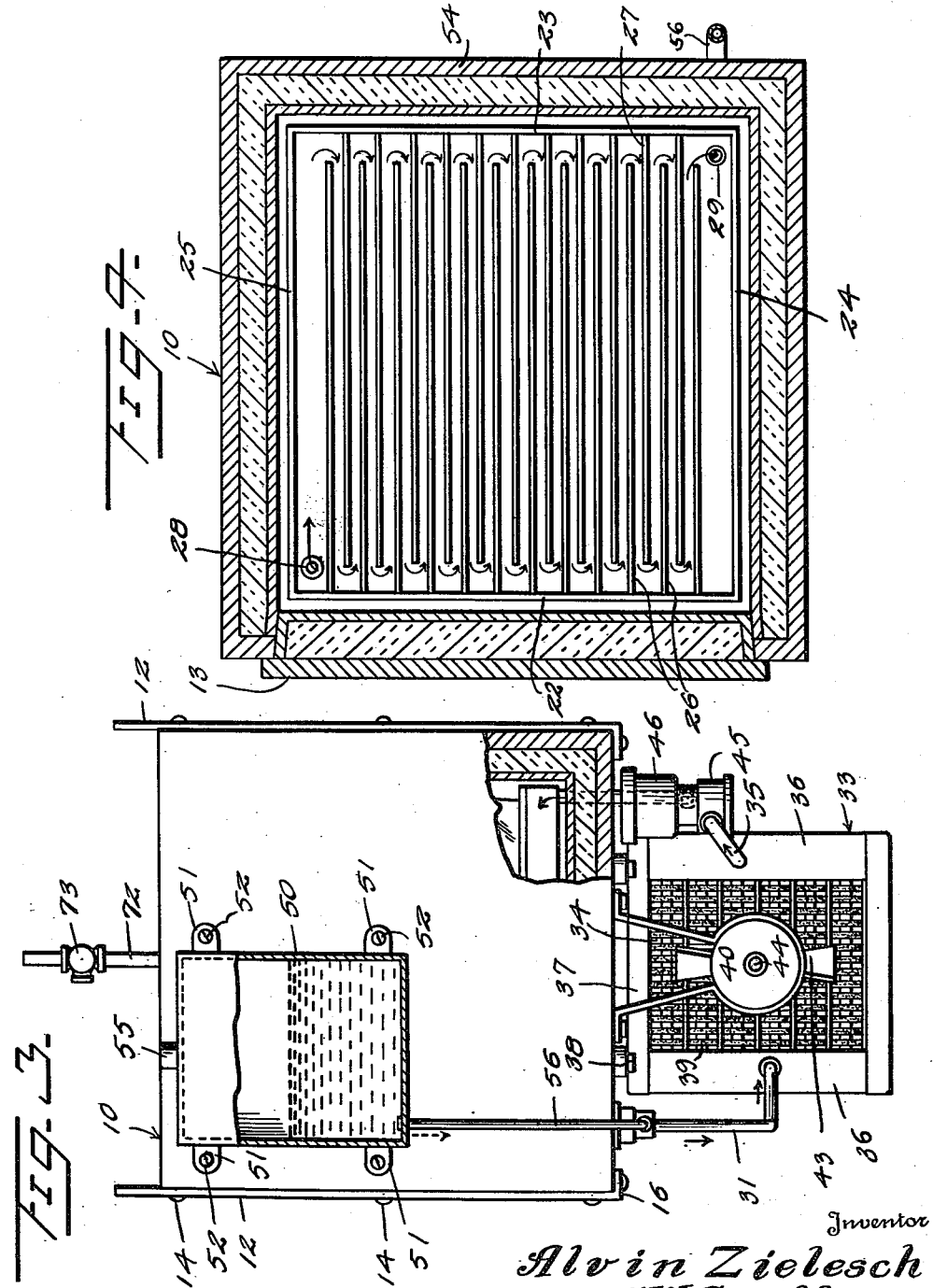

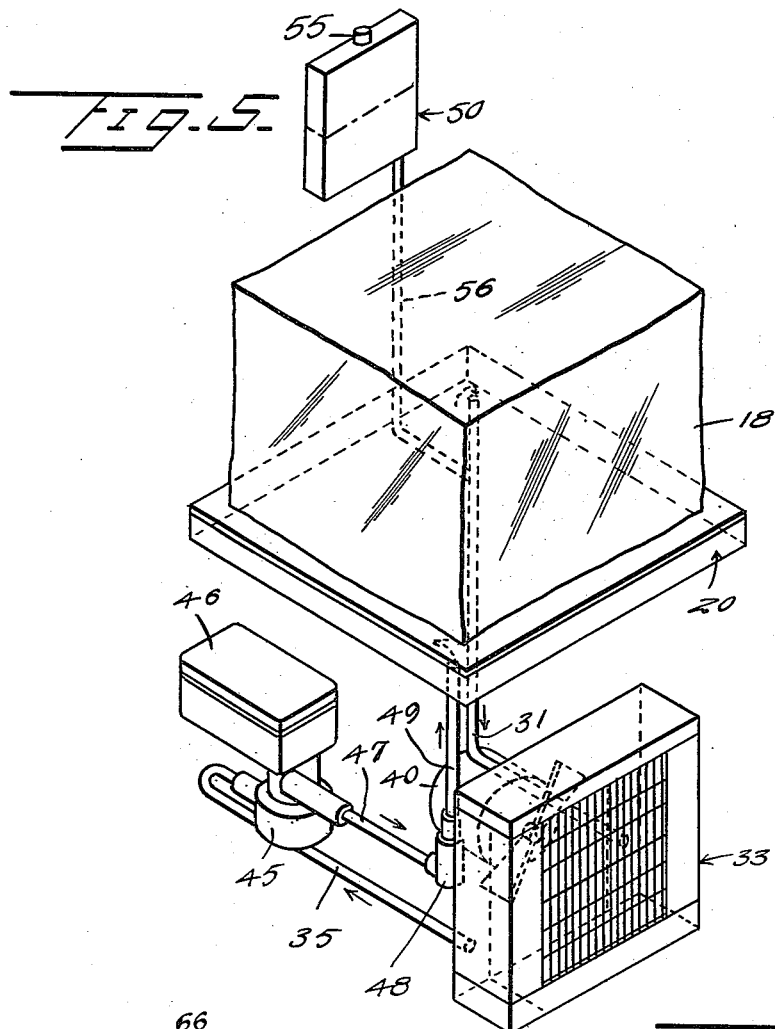
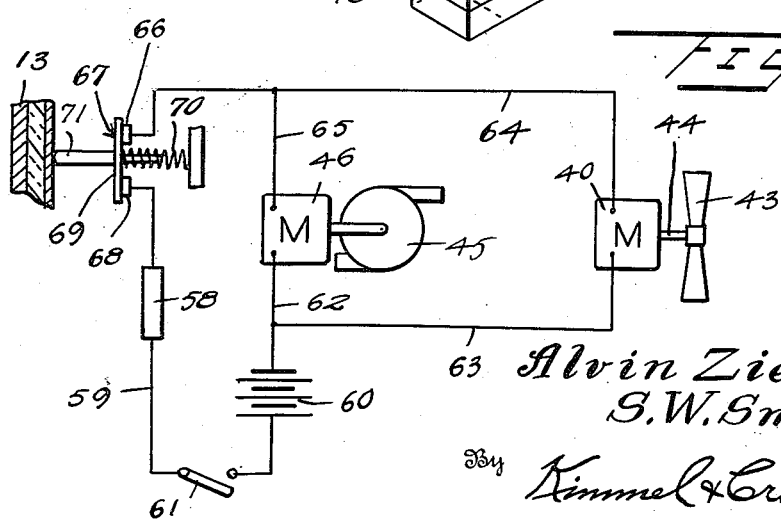

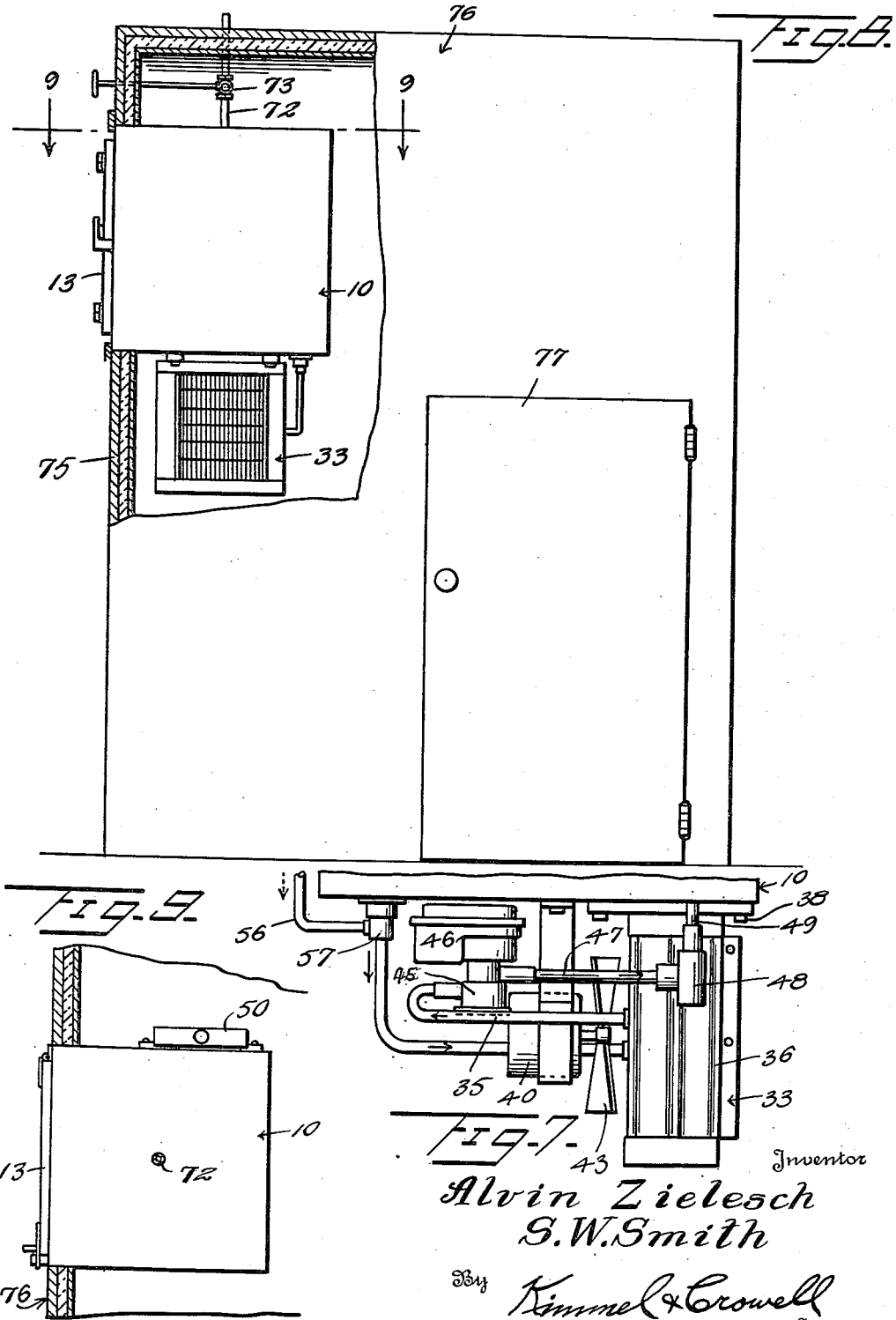

Patented June 29, 1943

2,323,270

UNITED STATES PATENT OFFICE 2,323,270

DRY ICE REFRIGERATING UNIT

Alvin Zielesch and Stanton W. Smith, Portland, Oreg.

Application April 1, 1941, Serial No. 386,331

4 Claims. (Cl. 62—91.5)

This invention relates to refrigerating devices and more particularly to a refrigerating unit for insertion in a refrigerating chamber which may be stationary or movable.

An object of this invention is to provide a refrigerating unit which includes a closed refrigerant system and a cold chamber for receiving a solid cake or body of carbon dioxide ($CO_2$), commonly know as dry ice, the carbon dioxide acting to maintain the refrigerant in the desired cooled condition.

Another object of this invention is to provide a refrigerating means of this kind wherein the sublimated gas emanating from the carbon dioxide may, if desired, be either partly or completely discharged into the refrigerating chamber where the gas acts as a preserving element for certain food products, such as meats. Where a food is in the refrigerating chamber which will be affected by the gas in an undesired manner, the sublimated gas may be discharged entirely into the atmosphere.

A further object of this invention is to provide a device of this kind which when mounted in a truck body or the like may be operated from storage batteries or the like, and the door to the cold chamber may be extended through a wall of the truck body so that the dry ice may be renewed without opening a door to the refrigerating chamber.

A further object of this invention is to provide a cooling unit of this kind which is thermostatically controlled and wherein the circulating fan is connected with a normally closed switch, which is connected with the entrance door to the refrigerating chamber, so that upon opening of the door the fan will be cut off in order that the cold air in the chamber will not be forced out during the time that the door is open.

A further object of this invention is to provide a combined refrigerating unit and air circulating means for circulating the cooled air about the refrigerating chamber.

A further object of this invention is to provide a unit of this kind which is so constructed that it will occupy only a very small amount of space, is light in weight, compact, and may readily be removed from the refrigerating chamber when refrigeration is not desired or is unnecessary.

To the foregoing objects and to others which may hereinafter appear, the invention consists of the novel construction, combination and arrangement of parts as will be more specifically referred to and illustrated in the accompanying drawings wherein are shown embodiments of the invention, but it is to be understood that changes, variations and modifications may be resorted to which fall within the scope of the invention as claimed.

In the drawings:

Figure 1 is a detail front elevation of a refrigerating unit constructed according to an embodiment of this invention, Figure 2 is a sectional view taken on the line 2—2 of Figure 1, Figure 3 is a detail rear elevation partly broken away and in section of the unit, Figure 4 is a sectional view taken on the line 4—4 of Figure 2, Figure 5 is a diagrammatic view of the cooling system embodied in this unit, Figure 6 is a diagrammatic view of the electric circuits embodied in this unit, Figure 7 is a fragmentary side elevation of the lower portion of the unit on the side thereof opposite from that shown in Figure 2, Figure 8 is a detail front elevation partly broken away and in section of a refrigerating chamber having a unit constructed according to an embodiment of this invention mounted therein, and Figure 9 is a sectional view taken on the line 9—9 of Figure 8.

Referring to the drawings the numeral 10 designates generally a cold chamber or housing which is heat insulated in a conventional manner and is provided in the front wall 11 thereof with a closure 13. The cold chamber 10 is adapted to be supported within a refrigerating chamber at a point closely adjacent the upper portion of the chamber and, preferably the cold chamber or housing 10 is supported in dependent relation from the upper portion of the refrigerating chamber by means of a plurality of supporting straps 12, which are secured to the sides of the chamber 10 by fastening devices 14. The upper ends of the straps 12 are extended above the top wall 15 of the housing 10 and may be secured in any desired manner to the upper portion of the refrigerating chamber. The lower ends of the supporting straps 12 are provided with right-angularly disposed lower end portions 16 engaging beneath the bottom wall 17 of the housing 10.

A solid body or cake of carbon dioxide ($CO_2$) designated as 18 is adapted to be disposed in the interior of the housing or cold chamber 10 and is adapted to rest on the top wall 19 of a closed receptacle 20. The receptacle 20 rests substantially on the bottom wall 17 of the housing 10 and comprises the top wall 19, a bottom wall 21, front and rear walls 22 and 23 respectively, and opposite end walls 24 and 25. The receptacle 20 is adapted to have a refrigerant liquid disposed therein, which is adapted to be cooled by the body 18, and preferably the interior of the receptacle 10 is provided with a plurality of opposed baffles 26 and 27, which are disposed in spaced apart parallel relation and extend from the front and rear walls 22 and 23 respectively thereby providing a tortuous passage for the refrigerant from the intake end 28 to the outlet 29. The upper and lower edges of the baffles 26 and 27 are fixed in any suitable manner to the top and bottom walls 19 and 21 respectively. The receptacle 20 is preferably supported in slightly spaced relation to the inner surface of the bottom wall 17 of the housing 10 by means of spacing members 30 which are interposed between the bottom wall 21 of the receptacle 20 and the inner side of the bottom wall 17 of the housing 10.

A pipe 31 is connected to the outlet port 29 of the receptacle 20 and extends downwardly through an opening 32 provided in the bottom wall 17. The pipe 31 at its opposite end is connected to a radiator structure, generally designated as 33. The radiator structure 33 includes a coil 34, which is connected at one end to the pipe 31 and is connected at the opposite end to a return pipe 35. The opposite ends of the coil 31 are mounted in substantially U-shaped housing members 36, which are secured to an upper or base member 37. The base member 37 is secured by fastening devices 38 to the under side of the bottom wall 17.

The coil 34 includes a plurality of radially arranged bristles or heat exchanging elements 39, which are fixed to the several convolutions of the coil 34 between the end housing members 36. The bristles or heat exchanging members 34 are adapted to dissipate the heat from the coil 34 and, preferably, the bristles or heat exchanging members 39 substantially fill the space between the confronting or inner edges of the housing or coil enclosing members 36 to such an extent that when air is forced through the coils 34 past the bristles or heat exchanging members, the heat from these members will be dissipated in the passing air.

In order to provide a means whereby air may be forced through the coil 34 we have provided a fan motor 40, which is suspended by means of a fan suspending strap 41 secured by fastening devices 42 to the botton wall 17. A fan blade member 43 is secured to the shaft 44 of the fan motor 40 and is disposed closely adjacent the rear side of the cooler unit 33, so that the fan blade structure 43 will force air through the cooler structure 33 for cooling thereby. A pump member 45 is interposed in the return pipe 35 and is operated by means of an electric motor 46. The pump 45 and the motor 46 are of conventional construction being of a type capable of being enclosed in a suitable housing and operated either from a storage battery or from commercial electric current. The return pipe 35 includes a branch 47 connected to the pump 45 and the branch 47 is connected to a check valve structure 48. The check valve structure 48 opens upwardly and is adapted to prevent downward flow of the refrigerant from the pipe 49, which connects the check valve 48 with the intake port 28.

In order to provide a means whereby the refrigerant system may be maintained in a filled condition at all times, we have provided an expansion chamber or a reservoir 50, which is provided with ears 51 secured by fastening devices 52 to the rear wall 54 of the housing 10. The reservoir 50 is substantially rectangular in side elevation being relatively narrow in depth and is provided with a filler cap 55 at the upper portion thereof, which may include an outwardly opening check valve or vent. The reservoir or expansion member 50 is connected by means of a pipe 56 to a coupling 57, which is interposed in the pipe 31. The expansion member or reservoir is adapted to be substantially half filled with liquid at all times, so that the refrigerating system will be maintained in a filled condition.

In order to provide a means whereby the two motors 40 and 46 may be automatically operated, we have provided a thermostat 58, which is connected by means of a conductor 59 to a source of electric current supply 60. The current supply 60 may be in the form of a storage battery or may be commercial electric current and a manually operated switch 61 is interposed in the conductor 59 between the battery 60 and the thermostat 68. A conductor 62 is connected to the opposite side of the battery 60 and is connected to one side of the pump motor 46. The second conductor 63 is connected at one end to the conductor 62 and is connected to the opposite end of the one side of the motor 40. The opposite side of the member 40 has a conductor 64 connected thereto and a conductor 65 is connected at one end to the opposite side of the motor 46 and to the conductor 64. The conductor 64 is connected at its opposite end to one contact 66 of a normally closed switch, which is disposed in a position for operation by opening and closing of the door or closure 13.

The switch structure, generally designated as 67, includes a second fixed contact 68, which is connected to the conductor 59 and also includes a bridging member 69, which is adapted to bridge the two contacts 66 and 68. A spring 70 is adapted to engage the bridging member 69 and is adapted to constantly urge the bridging member 69 to a circuit breaking position. The bridging member 68 is provided with a stem or operator 71 disposed in a position to contact with the door 13 so that when the door 13 is closed the bridging member 69 will be in a circuit closing position, which is the position of this bridging member, shown in Figure 6. When the door 13 is opened in order to insert a cake of carbon dioxide in the cold housing 10, the spring 70 will move the bridging member 69 to an open position, and thereby stop the fan motor 40 and also stop the pump motor 46. In this manner the circulation of the cold air within the refrigerating chamber within which the unit is mounted, will be stopped during the time that the door 13 of the cold chamber 10 is opened. In certain instances the switch structure 67 may be disposed in a position for operation by opening and closing of the door to the refrigerating chamber within which this unit is positioned instead of being positioned for operation by the cold chamber door 13.

The top wall of the housing 10 has a gas outlet pipe 72 connected at one end thereto and a manually operable valve 73 is interposed in the pipe 72. The valve member 73 includes a bypass 74 by means of which the gas passing upwardly through the pipe 72 may be by-passed into the refrigerating chamber within which this unit is positioned. The carbon dioxide gas emanating from the body 18 is of such a character that it will act as a preservative for certain foods, such as meats or the like, so that this gas may be released into the refrigerating chamber. However, where the articles being cooled are liable to be damaged by the carbon dioxide gas, the valve member 73 which may be a conventional 3-way valve may be turned so as to discharge the gas exteriorly of the refrigerating chamber.

In Figures 8 and 9 there is disclosed a refrigerating unit constructed according to this invention, which is mounted in the side wall 75 of a refrigerating chamber, generally designated as 76. The closure 13 is disposed in a position whereby the closure 13 may be opened or closed without the necessity of opening the door 77, which gives access to the chamber 76. In this manner the carbon dioxide may be renewed without opening the refrigerating chamber door 77. This arrangement may be used either for a stationary refrigerating chamber or a movable refrigerating chamber such as the body of a refrigerating truck or the like. It will be appreciated that where the cooling unit hereinbefore described is mounted on the inside of a truck and the refrigerating chamber of the truck is substantially completely filled with food articles, it is not desirable that the door to the refrigerating chamber be opened in order to replace the carbon dioxide. In instances of this kind the door 13 may be mounted in the outer wall 75 of the truck body, so that the cooling medium or body 18 may be replenished by merely opening the door 13 to the cold chamber.

In the use and operation of this refrigerating structure, the unit which includes the cold chamber or housing 10 with the motors 40 and 46 and the radiator structure 33 is adapted to be mounted on the interior of the refrigerating chamber within which food articles to be cooled are adapted to be placed. When the switch 61 is closed, the circuits to the two motors 40 and 46 will be closed and the thermostat 68, which is of conventional construction, may be set to maintain the desired temperature within the refrigerating chamber. The operation of the fan blade structure 43 by the motor 40 will force air through the cooling coils 34 and past the heat dissipating fins or elements 39, so as to cool the air passing through the coils 34 and this cold air will then be circulated about the interior of the refrigerating chamber.

The refrigerant in the closed system hereinbefore described will be maintained at the desired cold temperature by contact of the carbon dioxide 18 with the receptacle 20. By providing a tortuous passage for the refrigerant through the interior of the receptacle 20, the fluid will be forced to flow back and forth through the receptacle 20 from the intake end 28 to the outlet 29. This liquid is forced through the system by means of the pump 45, which has one end thereof connected to the return pipe 35 and the other or outlet side thereof connected to the branch 47. The upwardly opening check valve 48 in the branch 46 will prevent return flow of the refrigerant fluid when the pump 45 is stopped.

What we claim is:

1. A combined refrigerating and air circulating unit for insertion in a refrigerating chamber, comprising a housing adapted to receive a solid body of carbon dioxide, a closed refrigerant system correlated with said housing and including a flat closed receptacle in said housing and constituting an inner bottom therefor adapted to support said solid body, an air cooling coil dependingly supported from said housing, means connecting one end of said coil to said receptacle, means connecting the other end of said coil to said receptacle, a check valve interposed in said latter connecting means, a fluid circulating means connected with said latter connecting means between said check valve and said coil, a fan disposed adjacent one side of said coil for forcing air through the convolutions thereof, an expansion chamber and means connecting said expansion chamber with said first connecting means.

2. A combined refrigerating and air circulating unit for insertion in a refrigerating chamber, comprising a housing adapted to receive a solid body of carbon dioxide, a closed refrigerant system correlated with said housing and including a flat closed receptacle in said housing and constituting an inner bottom therefor adapted to support said solid body, an air cooling coil dependingly supported from said housing, means connecting one end of said coil to said receptacle, means connecting the other end of said coil to said receptacle, a check valve interposed in said latter connecting means, a fluid circulating means connected with said latter connecting means between said check valve and said coil, a fan disposed adjacent one side of said coil for forcing air through the convolutions thereof, an expansion chamber, means securing said expansion chamber to one side of said housing, and means connecting said expansion chamber with said first connecting means.

3. A combined refrigerating and air circulating unit for insertion in a refrigerating chamber, comprising a housing adapted to receive a solid body of carbon dioxide, a closed refrigerant system correlated with said housing and including a flat closed receptacle in said housing and constituting an inner bottom therefor adapted to support said solid body, an air cooling coil dependingly supported from said housing, means connecting one end of said coil to said receptacle, means connecting the other end of said coil to said receptacle, a check valve interposed in said latter connecting means, a fluid circulating means connected with said latter connecting means between said check valve and said coil, a fan disposed adjacent one side of said coil for forcing air through the convolutions thereof, a gas discharge pipe communicating at one end with said housing and at the other end with the atmosphere exteriorly of said chamber, a three-way valve interposed in said pipe and having one side thereof communicating with said chamber for selectively discharging carbon dioxide gas in said chamber and another side of said valve providing for selective gas discharge into the atmosphere.

4. A combined refrigerating and air circulating unit for insertion in a refrigerating chamber having a door, comprising a heat insulated housing adapted to receive a solid body of carbon dioxide, a closed heat transferring receptacle in said housing having an inlet and an outlet, a coil dependingly supported below said housing and connected at the opposite ends thereof with said inlet and outlet, means for circulating a refrigerant from said receptacle through said coil and back to said receptacle, a check valve correlated with said coil whereby to maintain the circulation in only one direction, means for forcing air past said coil for cooling thereby, a thermostat connected with said circulating means and said air forcing means and disposed in said chamber, and a normally closed switch biased to a circuit breaking position and disposed in a position for engagement with the chamber door whereby to hold said switch in a circuit closing position when the door is closed, said switch being electrically connected with said thermostat and said circulating means and said air forcing means.

ALVIN ZIELESCH.
STANTON W. SMITH.